United States Patent [19]

Stauter

[11] 3,972,790
[45] Aug. 3, 1976

[54] PRODUCTION OF METALLIC LEAD
[75] Inventor: John C. Stauter, Itasca, Ill.
[73] Assignee: UOP Inc., Des Plaines, Ill.
[22] Filed: Sept. 26, 1975
[21] Appl. No.: 616,983

[52] U.S. Cl. .............................................. 204/117
[51] Int. Cl.$^2$ .......................................... C25C 1/18
[58] Field of Search ...................... 204/117; 75/120

[56] References Cited
UNITED STATES PATENTS
1,456,798  5/1923  Hannay .............................. 204/117

Primary Examiner—R. L. Andrews
Attorney, Agent, or Firm—James R. Hoatson, Jr.; Raymond H. Nelson; William H. Page, II

[57] ABSTRACT

Metallic lead may be obtained from lead sulfide feed stocks or concentrates by fluorinating the lead sulfide, dissolving the resultant lead fluoride in hydrofluosilicic acid, separating the solid residue from the liquid and subjecting the liquid to electrolysis.

5 Claims, No Drawings

PRODUCTION OF METALLIC LEAD

BACKGROUND OF THE INVENTION

In standard methods of obtaining metallic lead from concentrates, the standard procedure has been to treat the lead sulfide concentrates in a blast furnace. However, the pyrometallurgical procedure possesses many disadvantages and drawbacks. Primary among these disadvantages is that the process will result in some major pollution problems such as the generation of sulfur oxide gas along with substantial fuming. The fuming carries with it possible carcinogenic compounds which will contain lead, cadmium, etc. Therefore, it is necessary to provide improved and safer methods for obtaining metals such as lead in metallic or elemental form by methods which will not contribute to pollution of the air or will be safer to operate. The aforementioned lead smelting techniques will consist of roast sintering the lead sulfide concentrate whereby a major portion of the sulfur will be removed followed by melting in a blast furnace to obtain the metallic lead.

In an effort to alleviate the pollution problem it is necessary to develop new processes for obtaining lead which will be competitive as an alternative to the conventional smelting practices. Prior work in the hydrometallurgical field resulted in developing a non-aqueous processing route whereby lead sulfide concentrates are chlorinated at temperatures above 300°C. to produce lead chloride and volatilized sulfur. However, chlorination at these elevated temperatures will promote the formation of volatile chlorides of contaminating elements such as iron, magnesium, aluminum, silicon, zinc as well as elemental sulfur which may be present in the lead sulfide concentrate. Other hydrometallurgical processes which have been developed include the use of ferric sulfate as a leach agent. In this method, the lead sulfide is sulfated to form lead sulfate. This step is then followed by carbonation of the lead sulfate to form lead carbonate and thereafter the lead carbonate is subjected to dissolution in hydrofluosilicic acid for electrolysis to metallic lead. Yet another hydrometallurgical method which was developed for the recovery of lead is based on the use of an acidic ferric chloride medium. This method involves a leaching step whereby the lead sulfide is converted to lead chloride and thereafter subjected to steps of solubilizing, crystallization and electrolysis to obtain the pure metal.

As will hereinafter be shown in greater detail, it is now possible to produce metallic lead in a relatively simple and economical manner by fluorinating lead sulfide at a relatively low temperature as contrasted to the prior art methods which have involved chlorination at relatively high temperatures with the attendant formation of undesirable compounds.

This invention relates to a hydrometallurgical process for the recovery of metallic lead. More specifically, the invention is concerned with an improved process for obtaining metallic lead from lead sulfide concentrates whereby unwanted side reactions are minimized and the metallic lead may be recovered in a relatively pure state.

It is therefore an object of this invention to provide an improved process for the production of metallic lead.

A further object of this invention is to provide a hydrometallurgical process for the production of metallic lead from lead sulfide concentrates.

In one aspect an embodiment of this invention resides in a process for the production of metallic lead which comprises the steps of: (1) treating a lead sulfide feed stock with a fluorinating agent, (2) dissolving the resultant lead fluoride in hydrofluosilicic acid, (3) separating the solid residue, (4) subjecting the clarified acid leach solution to electrolysis, and (5) recovering the resultant metallic lead.

A specific embodiment of this invention is found in a process for the production of metallic lead which comprises the steps of fluorinating lead sulfide by treatment with fluorine gas at a temperature in the range of from about 80° to about 120° C., dissolving the resultant lead fluoride in hydrofluosilicic acid at a temperature in the range of from about ambient to about 120° C., separating the solid residue from the acid solution, subjecting the acid solution to electrolysis and recovering the resultant metallic lead.

Other objects and embodiments will be found in the following further detailed description of the present invention.

As hereinbefore set forth, the present invention is concerned with a hydrometallurgical process for the production of metallic lead. The stock which is utilized in the present invention will comprise either flotation concentrates or raw feed ores which are naturally rich in lead sulfide, although it is contemplated that some of the lead may be present in the form of lead carbonate or lead oxide. In contradistinction to the prior art methods, the present invention utilizes a fluorination of the lead sulfide at relatively low temperatures ranging from about 80° to about 120° C. These prior art methods such as the treatment of lead sulfide with a large excess of ferric chloride which will give some elemental sulfur and leave an excess of ferric chloride which is more corrosive in nature thus necessitating the use of more expensive equipment and, in addition, is not as selective in the chlorination of lead only, more impurity metals going into solution and will come over in the brine filtration step along with the soluble lead chloride. The fluorination of the lead sulfide feed stock is effected at this temperature range by treating said feed stock with a fluorinating agent such as fluorine gas. The fluorination of the lead sulfide with fluorine gas results in the formation of lead fluoride with the attendant formation of elemental sulfur. Thereafter, the resulting mixture is treated with an aqueous leach electrolyte composited of hydrofluosilicic acid, this step being effected at temperatures in the range of from about ambient (20°–25° C.) up to about 120° C. By utilizing such a leach electrolyte composite of a compound containing a compatible halogen, it is possible to eliminate some steps in the production of metallic lead which are necessary when utilizing other halogenating agents. For example, it is possible to eliminate such steps which are associated with the chlorination methods as brine leaching at an elevated temperature, crystallization by allowing the temperature of the brine leach to drop and fused salt electrolysis to obtain the pure metallic lead.

Upon completion of the dissolution of the lead fluoride in the aqueous hydrofluosilicic acid, the solid residue which comprises elemental sulfur and metal impurities, the aforesaid solid residue is separated from the liquid acid bath. The separation of the solid residue from the liquid acid bath can be accomplished in any manner known in the art such as by flotation and settling whereby, after allowing the solid residue containing elemental sulfur and trace metals to settle, the liquid is removed by conventional means such as decantation, or by filtration in which the solids are separated from the liquid acid bath by passage through filtering material. The solid residue which contains gangue, unreacted sulfides or impurity metals such as zinc sulfide, copper sulfide, gold sulfide, silver sulfide and iron sulfide as well as elemental sulfur may then be subjected to a recovery treatment. For example, the elemental sulfur may be recovered by a froth flotation method in which the sulfur is preferentially floated. A scrubbing step to more fully liberate sulfur from the rest of the residue may also be effected in the presence of a flotation promoter such as organic compounds readily available including kerosine, etc. The treated material is then transferred to a flotation cell, and frothing agent is added, aeration is initiated and sulfur-laden froth is removed from the cell. As an alternative method, the residue may also be treated with aqueous ammonium sulfide in which the ammonium polysulfide which is formed permits the recovery of elemental sulfur in a crystalline form. In like manner, the impurity metals which are present in the lead sulfide concentrate and which pass over in the solid residue, may also be recovered by conventional means which will include cyanidation of the residue in a leaching operation to recover silver, gold or other precious metals.

It is also contemplated within the scope of this invention that the acid bath may also be treated in a minor purification step to recover any trace metals which may have come over in soluble form. For example, the acid bath may be subjected to a solvent extraction step with a solvent such as tributylphosphate, by treatment with an ion exchange resin or by a selective precipitation step in which the metals are removed by utilization of a specific precipitating agent.

The leach electrolyte comprising the hydrofluosilicic acid which contains the dissolved lead fluoride may then be subjected to direct electrolysis utilizing conditions which are well known in the art. For example, the electrolysis conditions may vary but will generally be effected at relatively mild temperatures ranging from about 20° to about 60° C. utilizing a voltage which will range from about 0.2 to about 4.0 volts. By utilizing this electrolysis the metallic lead may then be obtained by reduction at the cathode of the electrolytic cell.

The following example is presented to illustrate the process of the present invention. However, it is to be understood that this example is merely for the purpose of illustration and is not intended to limit the generally broad scope of the present invention in strict accordance therewith.

EXAMPLE

A feed stock consisting of 300 grams of lead sulfide concentrate is placed in a flask provided with means for allowing a constant rotation of the reactor. Following this, fluorine gas is charged to the reactor on a demand basis as dictated by the fluorination reaction, the temperature of the reactor being maintained in a range of from about 90° to about 100° C. by controlling the input of fluorine gas as well as providing heat from an external lamp source. The reaction is allowed to proceed for a period of about 2 hours, at the end of which time the fluorination product is recovered.

Thereafter the product is dissolved in a hydrofluosilicic acid solution which contains about 5% by weight of hydrofluosilicic acid, the dissolution of the lead fluoride being effected while maintaining the temperature of the solution at a temperature of about 65° C. The slurry is agitated for a period of about 0.5 hour and filtered to remove the solid residue containing elemental sulfur and trace metals. The filtrate comprising the leach electrolyte is then subjected to electrolysis in an electrolytic cell at a temperature of 50° C. and a voltage of 2.5 volts. The desired metallic lead is deposited as a pure ductile deposit at the cathode.

I claim as my invention:

1. A process for the production of metallic lead which comprises the steps of:
   1. treating a lead sulfide feed stock with a fluorinating agent,
   2. dissolving the resultant lead fluoride in hydrofluosilicic acid,
   3. separating the solid residue,
   4. subjecting the clarified acid leach solution to electrolysis, and
   5. recovering the resultant metallic lead.

2. The process as set forth in claim 1 in which said feed stock is treated with a fluorinating agent at a temperature in the range of from about 80° to about 120° C.

3. The process as set forth in claim 2 in which said fluorinating agent is fluorine gas.

4. The process as set forth in claim 1 in which said lead fluoride is dissolved in said hydrofluosilicic acid at a temperature in the range of from about ambient to about 120° C.

5. The process as set forth in claim 1 in which said solid residue contains elemental sulfur.

* * * * *